(No Model.) 4 Sheets—Sheet 2.
P. HOPE.
COMBINED HAY RAKE AND LOADER.
No. 468,035. Patented Feb. 2, 1892.
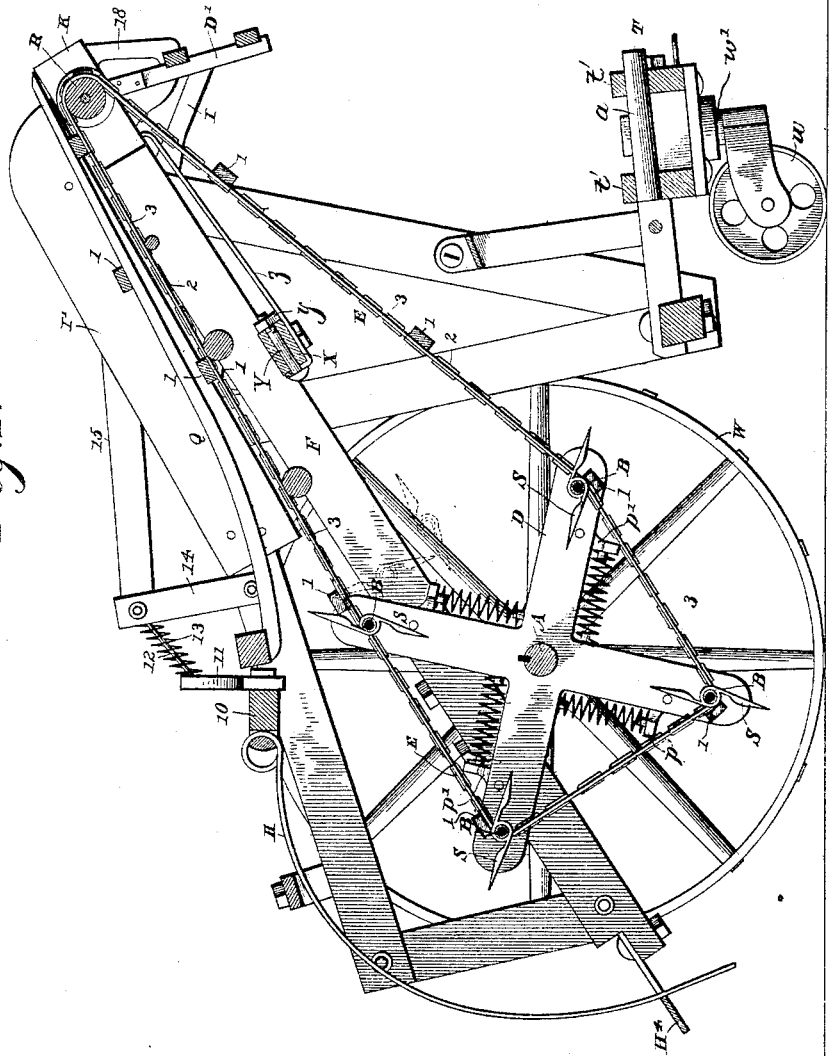
Witnesses:
J. M. Withrow
N. J. Collamer
Inventor
Patrick Hope,
By his Attorneys,
C. A. Snow & Co.

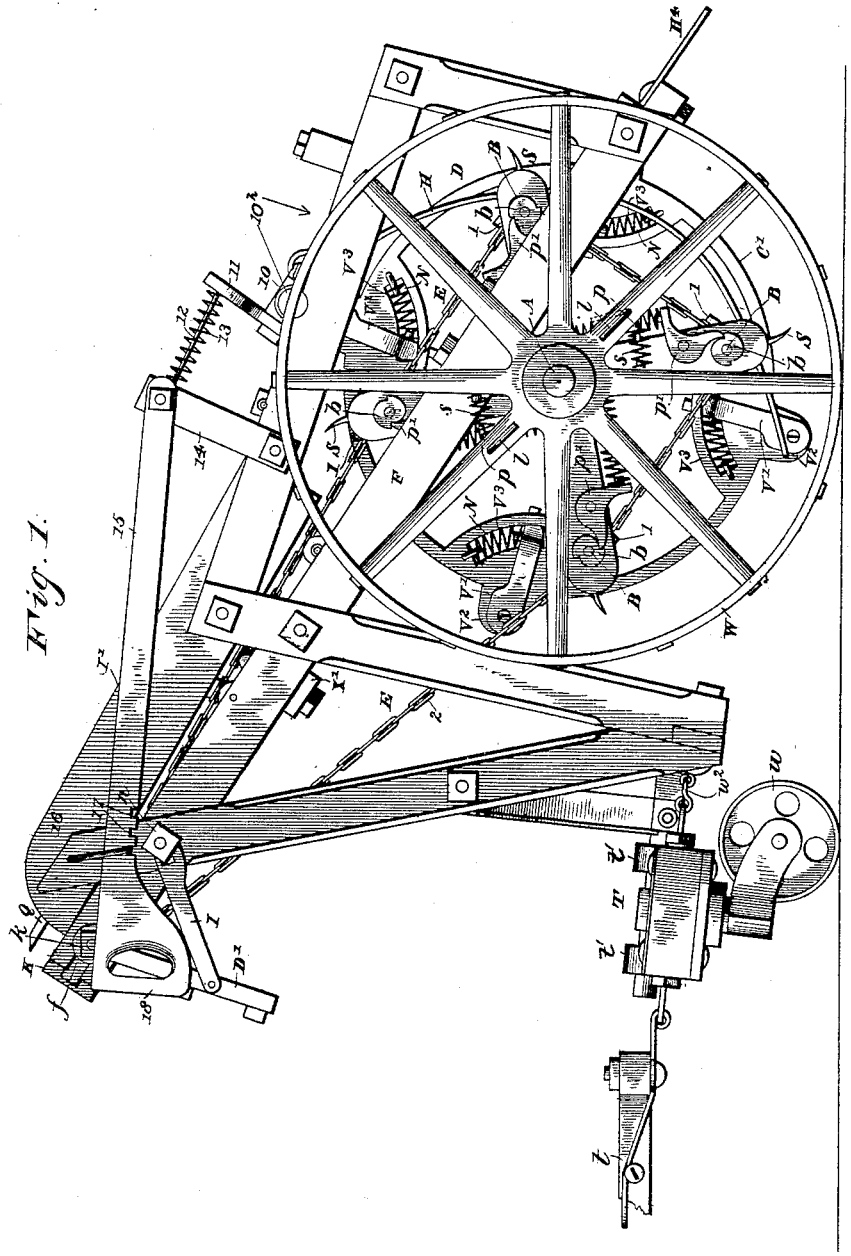

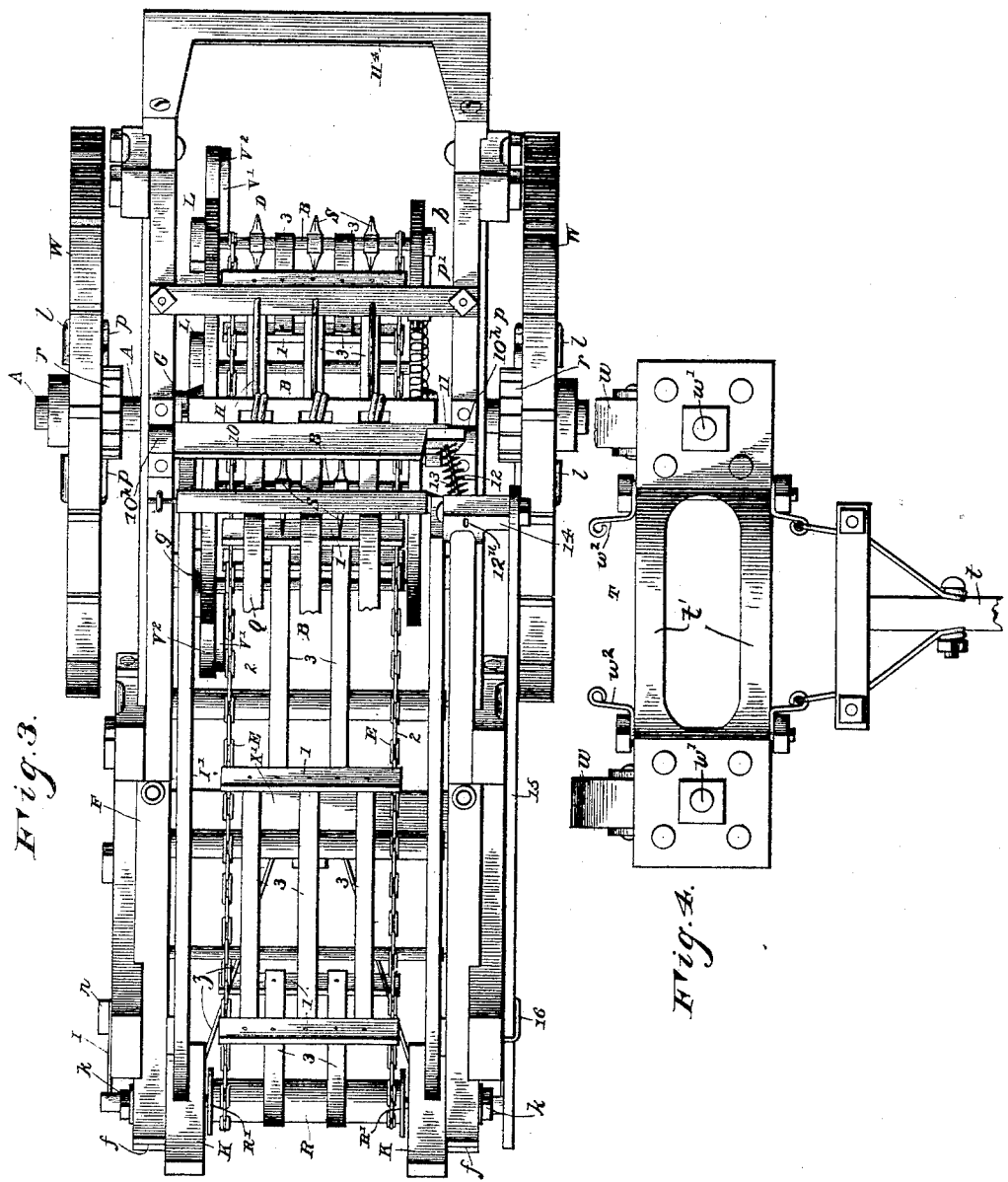

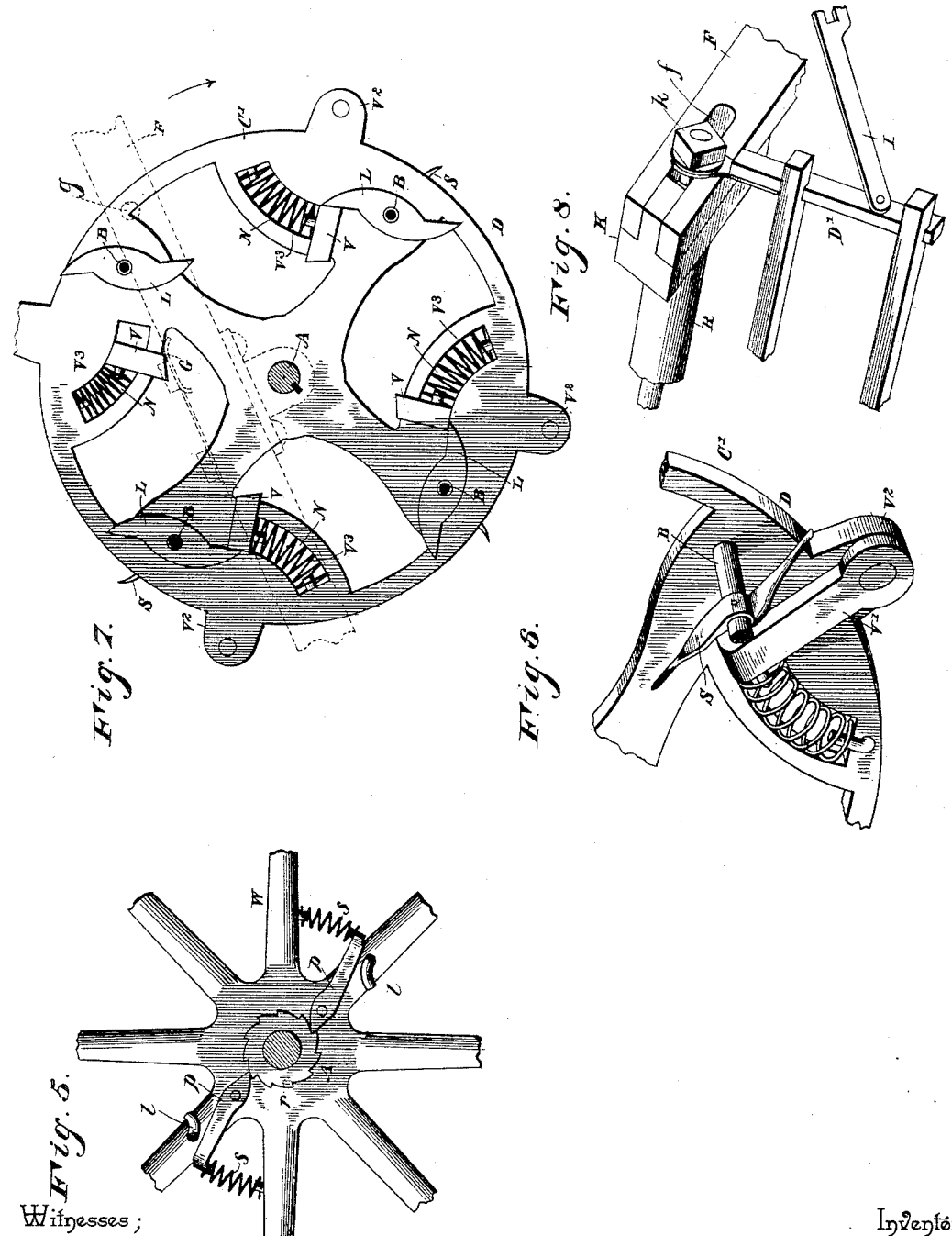

UNITED STATES PATENT OFFICE.

PATRICK HOPE, OF JANESVILLE, MINNESOTA.

COMBINED HAY RAKE AND LOADER.

SPECIFICATION forming part of Letters Patent No. 468,035, dated February 2, 1892.

Application filed May 9, 1891. Serial No. 392,146. (No model.)

*To all whom it may concern:*

Be it known that I, PATRICK HOPE, a citizen of the United States, residing at Janesville, (New Richland P. O.,) in the county of Waseca and State of Minnesota, have invented a new and useful Combined Hay Rake and Loader, of which the following is a specification.

This invention relates to rakes adapted to be connected or attached to a wagon, a harvester, or even to a thrashing-machine.

The object of the invention is to produce certain improvements in devices of this character.

To this end the invention consists in the details of construction hereinafter more fully described and claimed, and as illustrated on the four sheets of drawings, wherein—

Figure 1 is a side elevation of this improved rake and loader. Fig. 2 is a central longitudinal section with the rake raised. Fig. 3 is a plan view. Fig. 4 is a plan of the truck. Fig. 5 is an inside elevation of the hub of one of the wheels. Fig. 6 is an enlarged perspective detail of a part of the right-hand end of the drum, showing the inner side thereof. Fig. 7 is an elevation of the right-hand end of the drum, with the tripping and retaining studs shown in dotted lines in proper relative position. Fig. 8 is an enlarged perspective detail of the movable support for the depending frame.

In the said drawings, the letters W designate supporting-wheels mounted on the main axle A, and F is the main frame-work supported thereby and by the truck T. (Best seen in Fig. 4.) This truck has two eyes $t'$ at its center, pivotally mounted on a forwardly-projecting stub-axle $a$ on the frame-work and is supported by swiveled wheels $w$, whose journals $w'$ are mounted in the truck-body near its ends. The latter are loosely connected by chains or links $w^2$ with the frame-work F. Two shafts or a tongue $t$ is connected to the truck, by means of which it may be attached to a suitable device or drawn forwardly by a team.

D is a drum keyed upon the axle A and comprising radial arms connected near their outer ends by bars B, to which are secured the centers of double-pointed teeth S.

Inside the wheels W ratchet-wheels $r$ are secured to the axle, and pawls $p$, pivoted to the hubs of the wheels W, are pressed normally into engagement with these ratchet-wheels by expansive springs $s$. Levers $l$, journaled in certain of the spokes of the wheels, may be moved so as to turn the pawls on their pivots and disengage them from the ratchets, as seen in dotted lines at the right-hand side of Fig. 1.

K K are blocks moving in slots $f$ in the upper end of the frame F and held therein by nuts $k$ on a bolt passing through said blocks, and R is a roller journaled on the body of this bolt between the two blocks.

$z$ is a yoke whose divergent ends are connected with the blocks K and whose other ends pass beneath a cross-bar X of the frame F and are turned up, as seen in Fig. 2, and Y is a bolt passing through this cross-bar with its head engaging a loop in the connected ends of the yoke $z$, by which means the blocks K may be pushed upward in the slots $f$ before the nuts $k$ are tightened to hold the blocks against movement.

D' is a depending frame connected at its upper end to said blocks and having inclined arms I, taking over bolts $n$, whereby this frame can be moved with the blocks K.

E is an endless belt passing over the drum D and over the roller R inside the end flanges R' thereon, and beneath said roller it passes through the depending frame D'. This belt is preferably composed of transverse bars 1, connected by endless side chains 2, thus forming large links, and the bars are alternately connected by an alternating odd and even number of straps 3, the teeth S on the drum D being arranged to pass through the openings between said straps, as seen in Fig. 3, and to stand just in rear of the bars 1.

H is a hay-rake whose tines curve around behind the drum and inside the brace $H^4$, as seen in Fig. 2, and whose head 10, journaled in bearings $10^h$ on the side bars of the frame-work, has an upwardly-projecting arm 11, to which is connected a link 12, passing through an expansive spiral spring 13 and loosely through the upper end of an arm 14, where it is turned up, as at $12^u$. The arm 14 is pivoted at its lower end to the frame-work and connects with a hand-lever 15, which passes through an eye 16 and has a number of notches 17, as seen in Fig. 1. By this means the operator may draw upon the handle 18 of the lever 15, engaging one of the notches 17 in the eye 16, and thus swing the arm 14 and with it the arm 11, thereby rocking the head 10 and raising the tines of the rake, as may be desirable, and should said tines strike anything and be lifted thereby the spring 13 will permit the link 12 to slip through the arm 14, as will be clear. As the machine is drawn over the ground, the turning of the wheels W causes the drum D to revolve and the teeth S pick the hay or grain from the earth and carry it around inside the tines of the rake to the top of the drum. At this point the teeth S pass out of the belt E, and the cross-bars 1 of the same carry the hay or grain upwardly in the inclined trough I' and beneath a depressor Q (constructed in any preferred manner) to the point of delivery. The bars B, which connect the outer ends of the arms of the drum, are journaled in said arms, and on one end of each bar is secured a ratchet $b$, having two teeth, and which ratchet is engaged by a spring-actuated pawl $p'$, secured to the arm of the drum, the teeth on the ratchet being so disposed that one or the other end of the teeth S on the bar B will project outwardly. On the other end of the bar is keyed a long finger L, and this end of the drum is preferably made circular, as shown at C', so as to connect the outer ends of all of the arms. In this circular end is formed a slot N in rear of each bar B, and in this slot moves a lug V, which is secured to the outer end of an arm V', that is pivoted in a projection V² of the circular end of the drum, the lug V being pressed forward by a spring V³, so as to normally engage under one of the arms of the long finger L, and this lug prevents the bar B from turning in the opposite direction to that in which it is prevented from turning by the pawl $p'$ at its other end.

Referring now to Fig. 7, the letter G designates a stud carried by the frame F at such a point that when the drum D revolves the lug V will strike this stud and be pressed to the rear, so as to move away from beneath the long finger L. Next the forward end of this long finger strikes what I shall call the "turning stud" $g$, also carried by the frame, whereby the finger is caused to turn over to the rear and with it the bar B, and its teeth S also turn. The lug V, passing over the "tripping-stud" G, flies back to place under the force of the spring V³ after the finger has been turned over in this manner, and the latter, when it again comes into contact with the lug V under the operation of the turning stud $g$, is prevented from further movement until the drum has made one revolution. This turning of the fingers L, the bars B, and their teeth S takes place just at that point where the upwardly-moving belt leaves the drum, as seen in dotted lines in Fig. 2. The fingers normally project radially from the drum and operate just in rear of the bars 1, as shown, and unless some turning of the bars B and the fingers took place at the point shown the bars would be caught by the fingers so that the latter could not disengage them. This turning of the fingers is, furthermore, useful for the reason that whatever hay or straw may be held upon the fingers at this time will be slipped off the same as they pass downwardly between the links of the endless belt, and also draw across the rear faces of the bars 1.

This device, it will be understood, is to be hitched to the back of a hay-wagon, or even to a traveling thrashing-machine, and as it is drawn over the ground the teeth S and the rake H will pick up the hay or grain, carry it around the drum, and move it upwardly beneath the depressor Q, so as to deliver it into the wagon or thrashing-machine. When the endless belt E becomes loose, the roller R may be adjusted by loosening the nuts $k$ and $n$, moving the blocks K in the slots $f$, and then retightening the nuts. The angle of the rake H may be adjusted as desired by moving the handle 18 and engaging one of the notches 17 in the eye 16. When desired, the depressor Q may be raised to gain access to the trough I' for the purpose of cleaning and repair. The levers $l$ in the spokes of the wheels may be turned, when desired, to throw their inner ends against the pawls $p$ and move the latter so they will not engage the ratchet-wheels $r$, and the device may then be drawn over the road for a long distance without operating the loading mechanism.

It will be understood that much change may be made in the details of construction without departing from the spirit of my invention.

What is claimed as new is—

1. In a hay-rake, the combination, with a frame having a main axle connected to main wheels on said axle, and a delivery-belt carried by said drum, of a stub-axle secured to and projecting forwardly from the frame-work, a truck having eyes pivoted on said stub-axle and having a tongue attached thereto, wheels swiveled in the ends of said truck, and links loosely connecting said ends with the main frame-work, substantially as described.

2. In a hay-rake, the combination, with the supporting-wheels mounted on an axle carrying the frame-work, a drum also on said axle, and an endless belt passing over said drum for delivering the hay, of an eye 16 in said frame-work, a notched lever moving therethrough and connected with a pivoted arm, a rake whose tines pass in rear of said drum and whose head is pivoted on the frame-work and has an upwardly-projecting arm, a link connecting with said arm and passing loosely through said pivoted arm and turned up in front thereof, and a spring surrounding said link, substantially as described.

3. In a hay-rake, the combination, with a frame-work mounted on the main axle and having slots and a drum driven by said axle of blocks moving in said slots, a depending frame connected to said blocks, bolts and nuts holding said parts in adjusted positions, a roller journaled between said blocks, and an endless belt passing around said drum and roller and through said depending frame, substantially as described.

4. In a hay-rake, the combination, with the rotating axle, the frame-work mounted thereon, and the tripping and turning studs projecting inwardly from said frame-work, of a drum secured upon said axle and comprising arms through whose outer ends are journaled bars, spring-actuated lugs in the end of the drum adapted to be engaged by said tripping-stud, and long fingers on the ends of said bars normally engaged by said lugs and adapted to be engaged by said turning stud, the whole operating substantially as described.

5. In a hay-rake, the combination, with the rotating axle, the frame-work mounted thereon, and the tripping and turning studs projecting inwardly from said frame-work, of a drum secured upon said axle and comprising arms projecting outwardly at one end and similar arms at the other connected by a circular frame, bars journaled through the outer ends of said arms, a two-toothed ratchet on one end of each bar engaged by a spring-actuated pawl, a long finger on the other end of the bar, and an arm V', pivoted in a projection of said frame and having a spring-actuated lug normally engaging said finger and moving in the path of said tripping-stud, all as and for the purpose set forth.

6. In a hay-rake, the combination, with the rotating axle, a drum thereon, double-pointed fingers carried by the peripheral bars of said drum, and means, substantially as described, for imparting a semi-rotation to each of said bars at each revolution of the drum, of a roller mounted in the frame-work carried by said axle and an endless belt passing over said drum and roller, said belt comprising side chains connecting transverse bars, and an alternating odd and even number of straps connecting said bars between the side chains, as and for the purpose hereinbefore set forth.

7. In a hay-rake, the combination, with a frame-work mounted on the main axle, a roller in said frame-work, a drum rotated by said axle, and an endless belt passing over said drum and roller, the bars which form the sides of the drum being journaled in the ends thereof, of double-pointed fingers carried by said bars, and means, substantially as described, for turning each bar a half-revolution to the rear as its fingers draw out of the belt, substantially as described.

8. In a hay-rake, the combination, with a frame-work mounted on the main axle, a drum rotated by said axle, a roller in the frame-work, and an endless belt passing over said drum and roller, the bars which form the sides of the drum being journaled in the ends thereof, and said belt having transverse slats the same distance apart as the bars, of double-pointed fingers carried by said bars, and means, substantially as described, for holding the bars in position to project the fingers radially from the center of the drum through the belt in rear of the transverse slats thereon and for turning each bar a half-revolution to the rear as its fingers draw out of the belt on the ascending side of the latter, as hereinbefore set forth.

9. In a hay-rake, the combination of the rotating axle, a drum thereon, double-pointed fingers carried by the peripheral bars of said drum, and means, substantially as described, for imparting a semi-rotation to each of said bars at each revolution of the drum, as and for the purpose set forth.

10. In a hay-rake, the combination, with a frame-work mounted on the main axle, a drum rotated by said axle, and an endless belt passing over said drum, the bars which form the sides of the drum being journaled in the ends thereof, of double-pointed fingers carried by said bars and means, substantially as described, for turning each bar a half-revolution to the rear as its fingers draw out of the belt, substantially as described.

In testimony that I claim the foregoing as my own I have hereto affixed my signature in presence of two witnesses.

PATRICK HOPE.

Witnesses:
W. D. ABBOTT,
J. Q. ADAMS.